Figure 1:
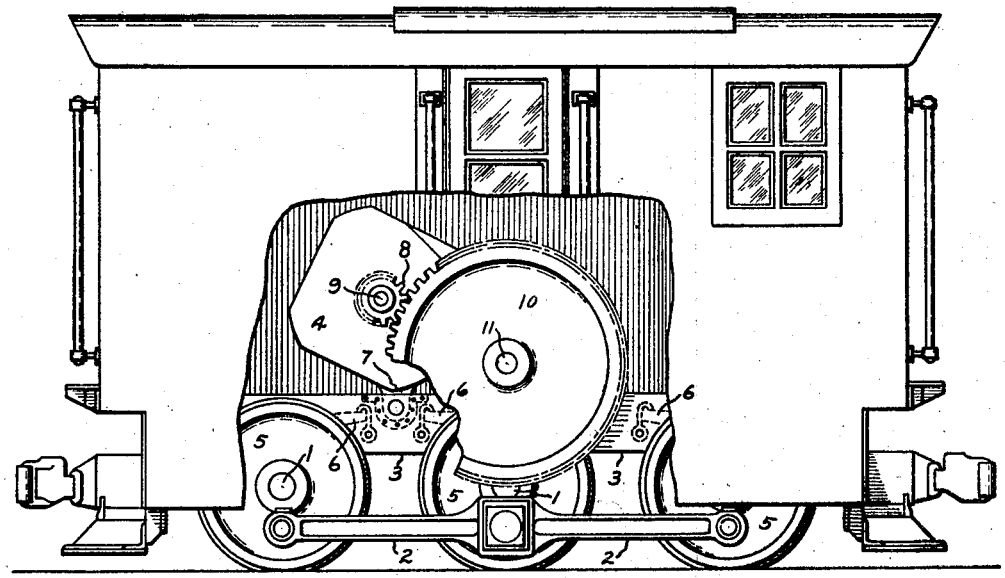

April 12, 1927. 1,624,709
A. F. BATCHELDER
LOCOMOTIVE OR CAR
Filed Aug. 4, 1924 2 Sheets-Sheet 1

Inventor
Asa F. Batchelder
His Attorney

April 12, 1927.

A. F. BATCHELDER

LOCOMOTIVE OR CAR

Filed Aug. 4, 1924

1,624,709

2 Sheets-Sheet 2

Inventor
Asa F. Batchelder
by
His Attorney

Patented Apr. 12, 1927.

1,624,709

UNITED STATES PATENT OFFICE.

ASA F. BATCHELDER, OF SCOTIA, NEW YORK, ASSIGNOR TO GENERAL ELECTRIC COMPANY, A CORPORATION OF NEW YORK.

LOCOMOTIVE OR CAR.

Application filed August 4, 1924. Serial No. 729,861.

My invention relates to locomotives or cars and is particularly applicable to locomotives of the side rod type.

Heretofore in building side rod locomotives, an electric motor drove a countershaft which was connected to and drove the axles of the locomotive through side rods. In such a construction, the motor and countershaft revolve at a uniform speed due to the fly wheel action of the armature and countershaft but the drive from the countershaft to the axles of the locomotive is necessarily non-uniform due to the clearances and lost motion. This results in delivering blows to and causing high stresses in the side rods and the frame of the locomotive. Also, irregularities in the track cause relative changes of speed between the axle and the driving motor which also result in high stresses in the side rods and the frame of the locomotive.

One of the objects of my invention is to construct an electric locomotive so as to eliminate such blows and stresses in the side rods and frame. In accordance with one aspect of my invention, the motor is geared through spur gearing directly to one of the driving axles, such driving axle being connected to and driving one or more additional axles through side rods. With such a construction, the uniform speed of the motor is transmitted directly to the driving axle to which it is geared and such driving axle will also run at uniform speed. Any changes in the speed of the axles connected together by the side rods due to lost motion in the side rods or to irregularities in the track are compensated for, due to the fact that the driving wheels are tied together by the track as well as by the side rods.

Another object of my invention is a novel construction and arrangement of the gearing between the motor and the axle of a locomotive. In locomotives of the type in which the motor is mounted on the frame of the locomotive, the shaft of the motor or the countershaft driven by the motor and the axle of the locomotive do not remain in alignment due to the fact that the frame of the locomotive is spring borne on the axles. In order to employ spur gearing between the motor and the axle, it is necessary that the teeth of the gears remain in mesh and alignment. In accordance with my invention, this is accomplished by providing a universal joint mounting of either the gear on the motor shaft or countershaft or the gear on the axle, and holding such gear having a universal joint mounting so that the teeth thereof are continuously in mesh and alignment with the teeth of the other gear.

Another object of my invention is to distribute the weight of the motor and gearing between the frame and the driven axle.

Figure 2:
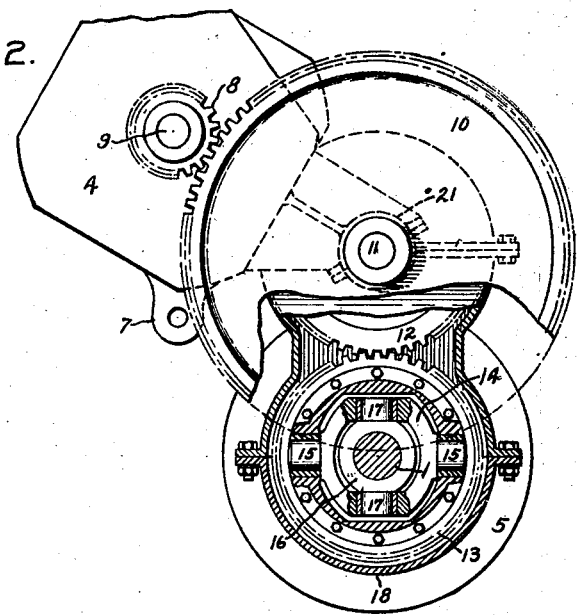
Figure 3:
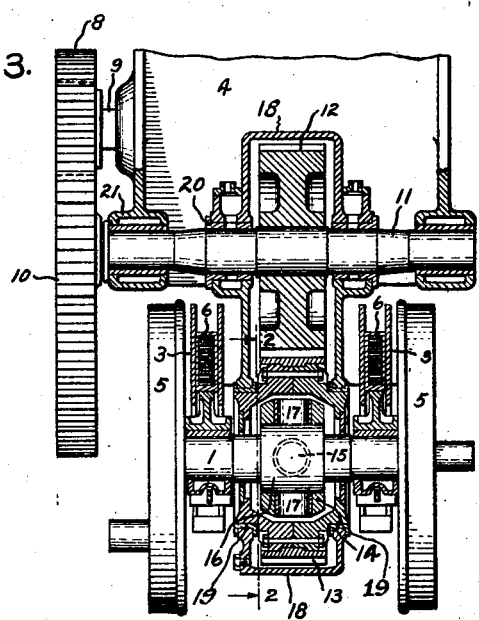

Other features of novelty which characterize my invention are pointed out with particularity in the claims annexed to and forming a part of this specification. For a better understanding of my invention, reference may be had to the following description taken in connection with the accompanying drawings, in which Fig. 1 is a view in elevation, with parts broken away, of an electric locomotive embodying my invention; Fig. 2 is a view in elevation, with parts in section on the line 2—2 of Fig. 3, of the gearing between the motor and axle of Fig. 1, and Fig. 3 is a sectional view of the gearing of Fig. 2.

The locomotive embodying my invention and illustrated in the drawing comprises a plurality of driving axles 1 with side rods 2 connecting all the driving axles together, a frame 3 spring borne on the axles, and an electric motor 4 mounted on the frame of the locomotive and arranged to drive one of the driving axles through spur gearing. The axles 1 have wheels 5 adapted to run on a track and the frame of the locomotive is located inside of the wheels so as to allow room on the outside of the wheels for the side rods. The mounting of the frame 3 on the axles 1 through springs 6 is of usual construction. The motor 4 is mounted on the frame of the locomotive by means of lugs 7 spaced apart, which support it from the frame at one side thereof. The spur gearing between the motor and one of the driving axles 1 comprises a spur gear 8 mounted on the motor shaft 9, a spur gear 10 meshing therewith and mounted on a countershaft 11, a spur gear 12 also mounted on the countershaft, and a spur gear meshing with gear 12 and mounted on the axle of the locomotive. As clearly shown in Fig. 3 of the drawing, the countershaft 11 extends through the bearings 21 of the motor 4 and also through bearings 20 of casing 18. The casing 18 bears on the gear 13 at 19 which has a universal connection with the driving axle 1. It will therefore be clear that the motor 4 is supported from the frame at one side by the spaced lugs 7 and at the other side by the driving axle 1 through the universal joint, gear 13, casing 18, bearings 20, countershaft 11 and bearings 21. By this construction the motor 4 may turn slightly on bearings 21 about the shaft 11 and also about the lugs 7 to permit the necessary movement of the parts when the springs 6 are deflected by the movement of the frame 3 relative to the axles 1 caused by vibration of the frame or irregularities in the track. The spur gear on the axle of the locomotive comprises a gear rim 13 having a universal mounting on the axle. This universal mounting comprises a member 14 mounted within the gear rim and having pins 15 journaled in the gear rim, and a member 16 fastened to the axle 1, mounted within the member 14 and having pins 17 journaled in the member 14, the pins 17 being arranged on an axis at right angles to the axis of the pins 15. It will, therefore, be seen that the gear rim 13 may move about the axis of the pins 15 and also about an axis at right angles thereto about the pins 17 and, consequently, has a universal movement with reference to the axle. Means are provided for holding the gear rim 13 in mesh and alignment with the gear 12 and is shown as a casing 18 engaging the gear rim 13 on both sides thereof and in which the gear rim is journaled at 19. This casing also engages the countershaft 11 and has journals 20 therefor. This casing is shown as split at the center lines of gear 12 and gear rim 13 for convenience in assembling. The countershaft 11 is shown as journaled in bearings 21 formed in the motor frame.

In the construction illustrated, it will be noted that there is a single drive gear 12 on the countershaft and a single gear on the driving axle, both of which are mounted substantially at the middle of their respective shafts.

In a locomotive constructed in accordance with my inventon, the electric motors, which run at uniform speed, will drive the axle to which it is geared at uniform speed through the spur gearing. Any change of speed of the other axles connected to the driving axle by the side rods will be compensated for, due to the fact that all of the driving axles are tied together not only by the side rods but also by the track on which the wheels, rigidly mounted on these axles, run.

I desire it to be understood that a universal mounting of any gear of the spur gearing between the motor and the driving axle may be employed instead of the particular gear shown, and I aim in the claims, to cover such a modification as well as any other modification, which does not depart from the spirit and scope of my invention.

What I claim as new and desire to secure by Letters Patent of the United States, is,—

1. In a locomotive, a plurality of driving axles having wheels thereon adapted to run on a track, a frame for said locomotive located inside of said wheels and spring borne on said axles, side rods connecting said axles, a motor mounted on said frame, a countershaft substantially parallel to said driving axles, spur gearing connecting the shaft of said motor with said countershaft, and spur gearing connecting said countershaft with one of said driving axles and comprising a gear on said countershaft and a gear rim surrounding said axle and having a universal joint connection therewith, said last-mentioned spur gearing being located between said wheels inside of said frame.

2. In a locomotive, a plurality of driving axles having wheels thereon adapted to run on a track, a frame for said locomotive located inside of said wheels and spring borne on said axles, side rods connecting said axles, a motor mounted on said frame, a countershaft arranged substantially parallel to said driving axles, spur gearing connecting the shaft of said motor with said countershaft, spur gearing connecting said countershaft with one of said driving axles, said spur gearing comprising a single gear on said countershaft and a single gear rim surrounding said axle and having a universal joint connection therewith, and means for holding said gear rim so that the teeth thereof are continuously in mesh and alignment with the teeth on said gear, said last-mentioned spur gearing being located between said wheels inside of said frame.

3. A locomotive comprising a plurality of axles having wheels thereon adapted to run on a track, a frame spring borne on the axles, an electric motor pivotally supported on the frame to rock on an axis parallel with the axles, gearing between the motor and one of said axles comprising a gear having therein a universal joint connection with said one axle and means journalled on said gear for holding the same in fixed driving relation with the motor and for forming an additional support for the motor.

4. A locomotive comprising a plurality of axles having wheels thereon adapted to run on a track, a frame spring borne on the axles, an electric motor having a support on the frame and having a support on one of the axles, said latter support comprising a member having a universal joint connection with the axle.

5. A locomotive comprising a plurality of axles having wheels thereon adapted to run on a track, a frame spring borne on the axles, an electric motor having a pivotal support on the frame, gearing connecting the motor with one of the axles comprising a ring gear on said one axle, a universal joint between the ring gear and said one axle, and a casing for the gearing secured to the motor and having a bearing on the ring gear whereby the elements of the gearing are held in proper alinement irrespective of tilting movements of the axle.

In witness whereof, I have hereunto set my hand this 31st day of July, 1924.

ASA F. BATCHELDER.